United States Patent
Peng

(12) United States Patent    (10) Patent No.: US 7,024,503 B2
Peng    (45) Date of Patent: Apr. 4, 2006

(54) LINK BUS BETWEEN CONTROL CHIPSETS AND ARBITRATION METHOD THEREOF

(75) Inventor: Sheng-Chang Peng, Taipei (TW)

(73) Assignee: Via Technologies, Inc., Taipei (TW)

( * ) Notice: Subject to any disclaimer, the term of this patent is extended or adjusted under 35 U.S.C. 154(b) by 221 days.

(21) Appl. No.: 10/617,754

(22) Filed: Jul. 14, 2003

(65) Prior Publication Data

US 2004/0186941 A1    Sep. 23, 2004

(30) Foreign Application Priority Data

Mar. 20, 2003 (TW) .............................. 92106112 A

(51) Int. Cl.
*G06F 13/42* (2006.01)
*G06F 13/14* (2006.01)
*G06F 13/36* (2006.01)
*G06F 13/20* (2006.01)

(52) U.S. Cl. .................... 710/105; 710/305; 710/312; 710/313; 710/240; 710/244; 370/420

(58) Field of Classification Search ................ 710/312, 710/244, 240, 313, 305, 105; 370/420
See application file for complete search history.

(56) References Cited

U.S. PATENT DOCUMENTS

| | | | | |
|---|---|---|---|---|
| 5,253,348 A * | 10/1993 | Scalise | ........................ | 710/113 |
| 5,611,058 A * | 3/1997 | Moore et al. | ................ | 710/311 |
| 5,740,387 A * | 4/1998 | Lambrecht et al. | ......... | 710/300 |
| 5,937,173 A * | 8/1999 | Olarig et al. | ................ | 710/312 |
| 6,148,357 A * | 11/2000 | Gulick et al. | ................ | 710/309 |
| 6,247,102 B1 * | 6/2001 | Chin et al. | ................... | 711/150 |
| 6,683,876 B1 * | 1/2004 | Tornes et al. | ............ | 370/395.1 |
| 6,845,420 B1 * | 1/2005 | Resnick | ...................... | 710/303 |

* cited by examiner

*Primary Examiner*—Rehana Perveen
*Assistant Examiner*—Christopher A. Daley
(74) *Attorney, Agent, or Firm*—Rosenberg, Klein & Lee

(57) ABSTRACT

A bus structure is implemented within a control chipset between a first control chip and a second control chip, comprising a first AD bus and a second AD bus. According to an arbitration method implemented to allow a dynamic adjustment of the direction of the AD buses transmission, the first control chip has a higher access priority in respect of the first AD bus, while the second control chip has a higher access priority in respect of the second AD bus. When the load of the first AD bus driving by the first control chip is high, a request signal is transmitted from the first control chip to the second control chip, so that if the second control chip is not currently using the second AD bus, the ownership of the second AD bus is handed over to the first control chip to improve the transmission efficiency, and vice versa.

11 Claims, 3 Drawing Sheets

LINK BUS BETWEEN CONTROL CHIPSETS AND ARBITRATION METHOD THEREOF

BACKGROUND OF THE INVENTION

1. Field of the Invention

The invention relates to a link bus between control chipsets and an arbitration method thereof. More particularly, the invention provides a bus structure that is capable of dynamically adjusting the transmission direction of AD buses and an arbitration method thereof. The bus structure of the invention comprises a first AD bus and a second AD bus placed between a first control chip and a second control chip. Each control chip respectively has a high access priority in respect of one AD bus. According to the load of each AD bus, each control chip can dynamically drive to control the other AD bus, thereby improving the transmission efficiency between the control chips.

2. Description of the Related Art

The system architecture of conventional computers is principally constituted of the peripheral component interface (PCI) system, in which the central processor unit (CPU) connects through a host bridge (for example, north bridge chip) to the PCI bus. In turn, the PCI bus respectively connects to the masters of various PCI-compatible peripheral devices, such as a graphic adapter, an expansion bus bridge, a LAN adapter, or a SCSI host bus adapter, etc.

As developments are made in the information technology and semiconductor manufacture, the control chip (for example, south bridge chip) progressively integrates more peripheral device masters. Because the peripheral devices controlled by the south bridge chip become numerous, the data transmission with the north bridge chip or the CPU consequently also increases. In the traditional PCI system architecture, the south bridge chip must commonly share the bandwidth of the PCI bus, which usually causes delay of data transmission and undesirably affects the general performance of the system.

The prior art has partly solved the above problem, as disclosed in the Taiwanese Patent No. 468112, entitled "Arbitration method for link bus between control chipsets", and incorporated herein by reference. FIG. 1 is a schematic view illustrating the solution proposed by the aforementioned reference. A CPU 14 connects through a north bridge chip 10 to a memory 16, an AGP bus and a south bridge chip 12. The south bridge chip 12 respectively connects through a PCI bus and an ISA bus to various peripheral devices.

A link bus between control chipsets 18 is placed between the north bridge chip 10 and the south bridge chip 12. The bus 18 principally comprises: an address/data (AD) bus 186 with a set of eight bi-directional signal lines, a bi-directional bit enable signal line 185, an up link command signal line 187 and an up link strobe signal line 189 respectively driven by the south bridge chip 12, and a down link command signal line 181 and a down link strobe signal line 183 respectively driven by the north bridge chip 10.

Because the AD bus 186 is a bi-directional common bus, an arbitration mechanism is usually needed between the north bridge chip 10 and the south bridge chip 12 to achieve an effective utilization of the AD bus without conflict. In the Taiwanese Patent No. 46812, one control chip, for example the north bridge chip, usually possesses the control of the bus, while the other control chip, for example the south bridge chip, has a higher priority on the bus. When the south bridge chip transmits a bus request signal, the north bridge chip must immediately, or after the bus command currently executed is completed, switch the control of the bus to the south bridge chip. Through this known arbitration method, the link bus between control chipsets can be effectively used, and the data transmission is independently performed without commonly sharing the bandwidth of the PCI bus with other peripheral devices.

However the above technical solution of the prior art may increase the general transmission efficiency, there may be something for further improvements. For example, because one single bi-directional common AD bus is implemented, the time of bus utilization may be inadequately allocated when there is a simultaneous need from both north bridge chip and south bridge chip. Moreover, a turn-around cycle of the clock cycle is usually necessary to hand over the bus utilization. To prevent the south bridge chip from erroneously assuming that the north bridge chip is not controlling the bus while the north bridge chip has already transmitted a command and is in standby for executing the next data transmission, waiting a predetermined cycle further is necessary after the south bridge chip has transmitted the bus request signal to access the bus. This turn-around and wait create a time interval during which no data transmission is performed, which constitutes an inefficiency use of time.

SUMMARY OF THE INVENTION

It is therefore an object of the invention to provide a bus structure and an arbitration method that can increase the utilization rate of the bus bandwidth and prevent a general reduction in efficiency due to bus access waiting time.

It is another object of the invention to provide a link bus between control chipsets that comprises two AD buses, which ensures that each control chip can immediately access one bus to transmit data to the other control chip.

Furthermore, it is another object of the invention to provide a link bus between control chipsets that has two bi-directional common AD buses capable of flexibly operating so that the transmission bandwidth is efficiently used.

It is still another object of the invention to provide a link bus between control chipsets in which each control chip respectively has a higher priority in respect of one bus, which thereby prevents a single control chip from occupying the utilization of all the buses during a long interval of time.

It is still another object of the invention to provide an arbitration method of a link bus between control chipsets, by means of which each control chip is accorded a higher priority in respect of one AD bus. When the demand of bus utilization from one control chip is higher, this control chip transmits a bus request signal. If the other control chip is not currently controlling the other bus, the utilization of the other bus is turned to the first control chip, which increases the transmission rate.

It is another object of the invention to provide an arbitration method of a link bus between control chipsets, by means of which when a control chip has a higher priority vis-à-vis the utilization of one AD bus, if this latter is currently occupied by another control chip, the utilization of this AD bus is switched after the transmission of a bus request signal, which thereby ensures that each control chip can access one AD bus for data transmission at anytime.

To achieve the above and other objectives, the bus structure of the invention is implemented in a control chipset, comprising a first control chip and a second controls chip, to transmit address and data therebetween. The link bus between control chipsets comprises a first address/data (AD) bus and a second address/data bus. The first AD bus transmits address and data from the first control chip to the second control chip. The second AD bus transmits address and data from the second control chip to the first control chip. It is thereby ensured that each control chip has access in real-time to the AD buses for data transmission.

According to the invention, an arbitration method of a link bus between control chipsets is further provided. The system comprises a first control chip, a second control chip, a first AD bus and a second AD bus. According to the arbitration method of the invention, the first control chip uses the first AD bus to transmit address and data to the second control chip. When the first control chip needs control the second AD bus, the first control chip transmits a bus request signal. If the second control chip is currently controlling the second AD bus, the second control chip continues controlling the second AD bus. If the second control chip needs not control the second AD bus, the utilization of the second AD bus is occupied by the first control chip after a turn-around cycle, which thereby ensures that each control bus have access in real-time to the AD buses for data transmission. The transmission efficiency is thereby improved.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Figure 1:
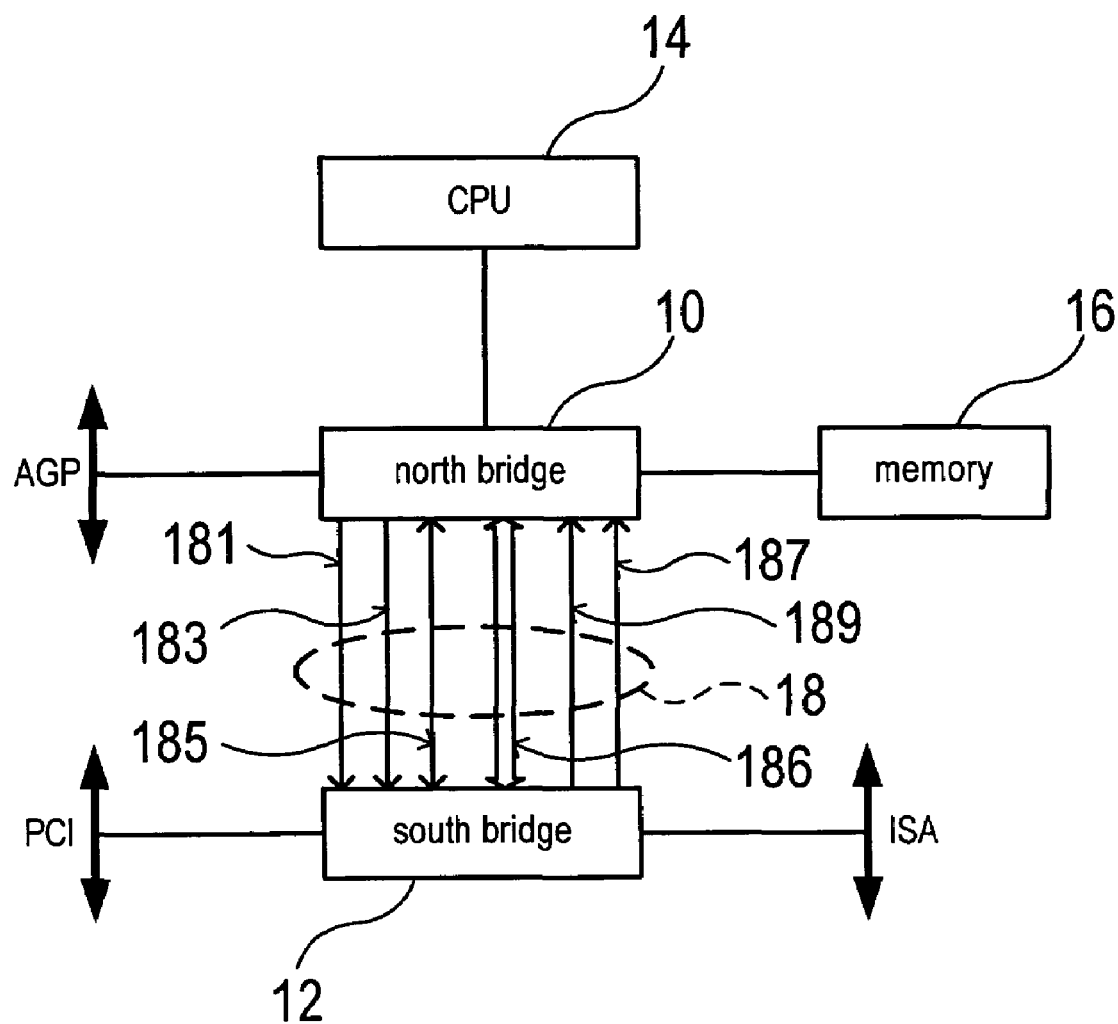
FIG. 1 is a schematic view of a link bus between control chipsets known in the prior art.

Wherever possible in the following description, like reference numerals will refer to like elements and parts unless otherwise illustrated.

Figure 2:
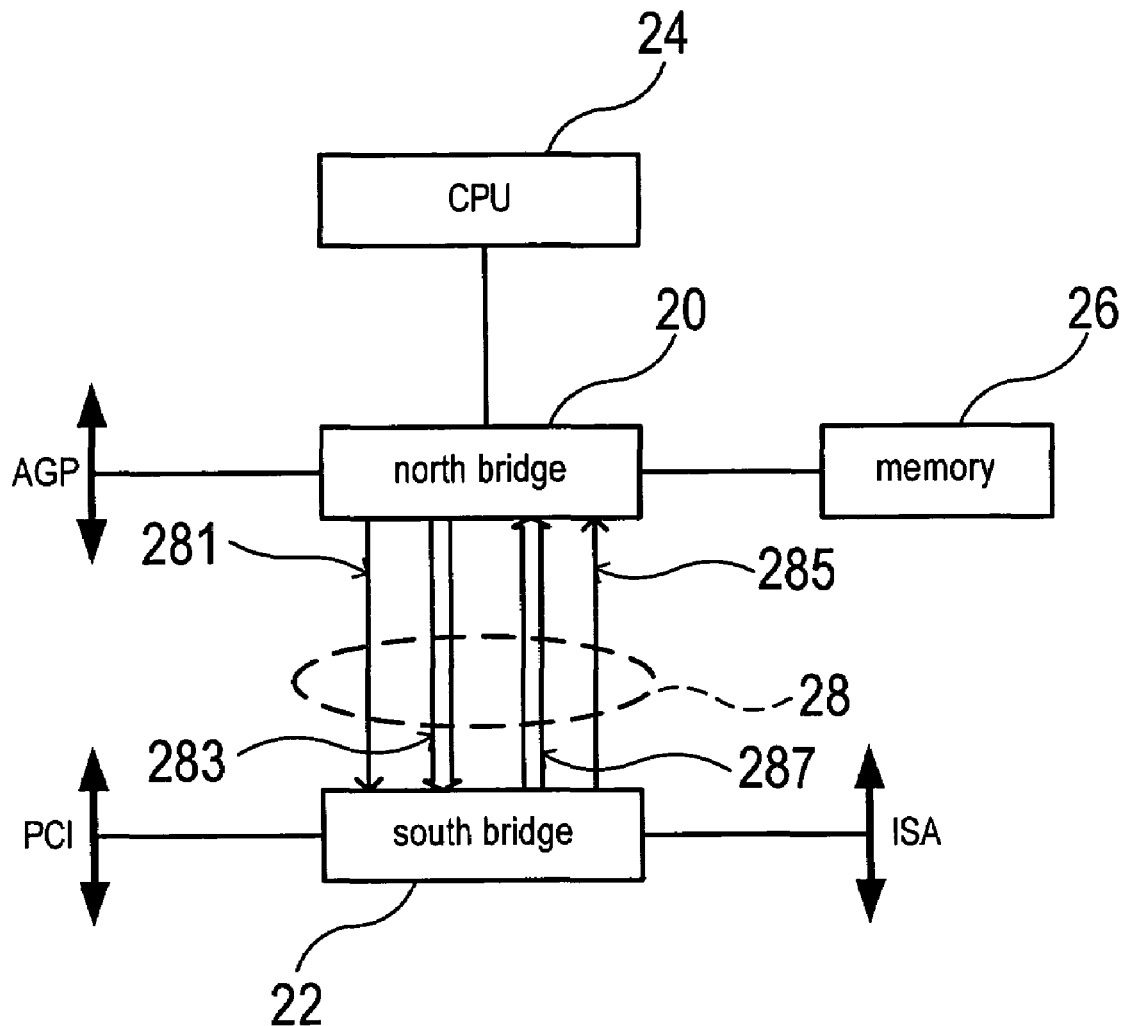
FIG. 2 is a schematic view of a link bus between control chipsets according to one embodiment of the invention.

FIG. 2 illustrates a block diagram of an embodiment according to the invention. As illustrated, in an embodiment of the invention, a central processor unit (CPU) 24 connects through a first control chip (north bridge) 20 to respectively an accelerated graphic port (AGP), a memory 26 and a second control chip (south bridge) 22. The south bridge 22 further connects through a PCI bus or an ISA bus to other peripheral devices.

A link bus 28 is placed between the north bridge 20 and south bridge 22. The bus 28 at least includes a down link command signal line 281 for transmitting a bus command from the north bridge to the south bridge, an up link command signal line 285 for transmitting a bus command from the south bridge to the north bridge, a down link address/data (AD) bus 283 for transmitting data and address from the north bridge to the south bridge, and an up link address data bus 287 for transmitting data and address from the south bridge to the north bridge. By implementing the above bus structure, the north bridge and the south bridge can have access to a bus at anytime, and need not wait for a bus arbitration. Therefore, no loss through delay of data transmission will occur.

Figure 3:
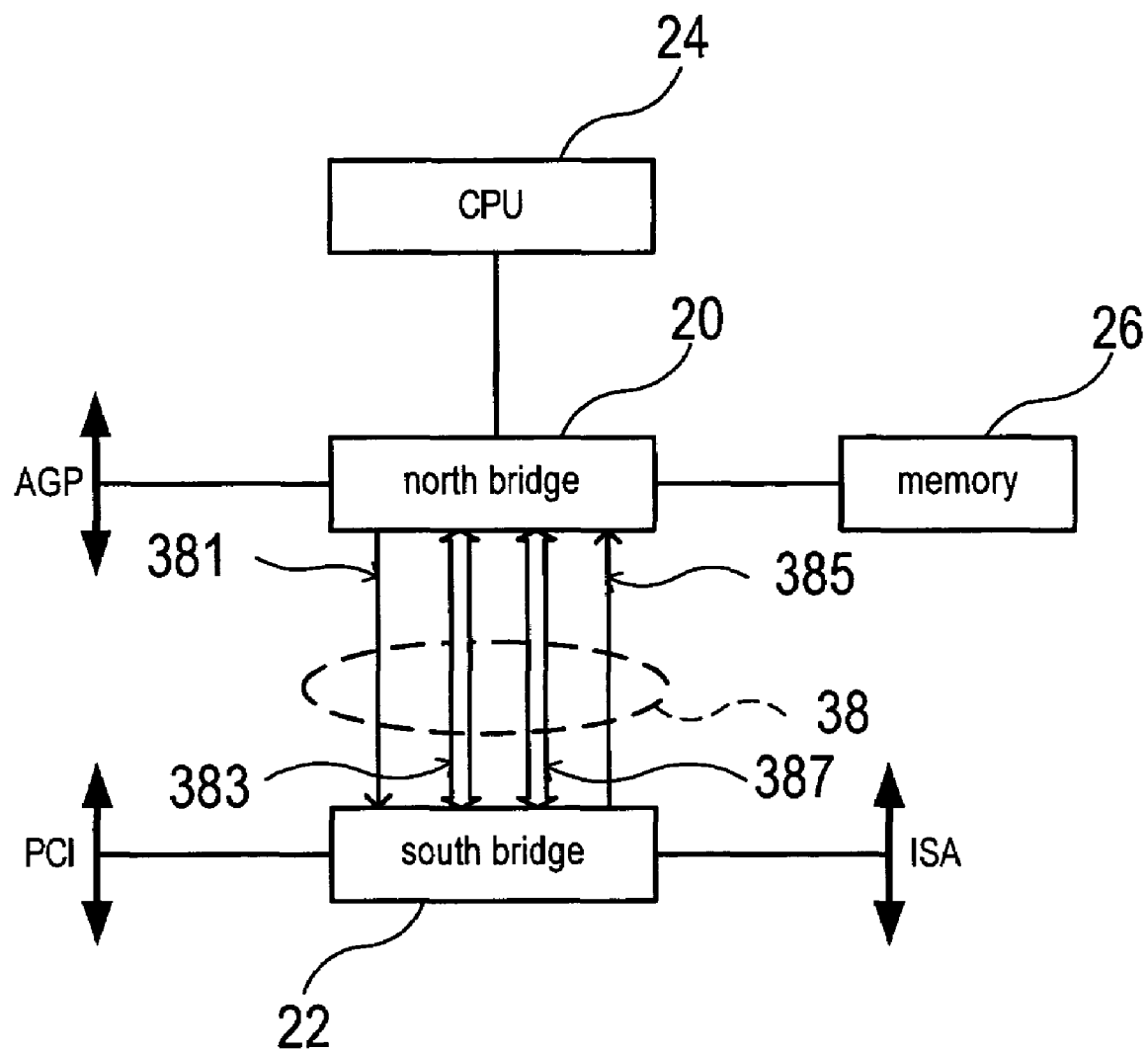
FIG. 3 is a schematic view of a link bus between control chipsets according to another embodiment of the invention.

FIG. 3 is a block diagram of another embodiment according to the invention. As shown, the structure of this embodiment is very similar to that of FIG. 2. However, the link bus between control chipsets 38 principally comprises a down link command signal line 381 for transmitting a bus command from the north bridge to the south bridge, such as a bus request signal, an up link command signal line 385 for transmitting a bus command from the south bridge to the north bridge, such as a bus request signal, a down link preferred bus 383 and an up link preferred bus 387 used for data and address transmission respectively between the north bridge and south bridge. In particular, the down link preferred bus 383 and the up link preferred bus 387 are bi-directional common address and data buses capable of dynamically adjusting the direction of data transmission of each AD bus in accordance with the loading of each AD bus. An optimal utilization of the bus transmission bandwidth is therefore achieved.

In the present embodiment, as the down link preferred bus 383 and the up link preferred bus 387 are bi-directional common buses, therefore a good arbitration method is required to obtain an efficient bus utilization. According to an arbitration method of the invention, the north bridge 20 is accorded a higher priority of controlling the down link preferred bus 383, while the south bridge 22 has a higher priority of controlling the up link preferred bus 387. In a usual condition, the north bridge 20 uses the down link preferred bus 383 to transmit data to the south bridge 22, while the south bridge 22 transmits data through the up link preferred bus 387 to the north bridge 20. However, when the load of the down link preferred bus 383 driving by the north bridge 20 is substantially high, a request signal is transmitted through the down link command signal line 381 to the south bridge 22. At this moment, if the south bridge 22 is currently controlling or is to control the up link preferred bus 387, the request transmitted from the north bridge 20 does not change the ownership of the bus and the south bridge 22 keep controlling the up link preferred bus 387. On the contrary, if the south bridge 22 does not need to control the bus, the ownership of the up link preferred bus 387 is handed over to the north bridge 20 after a turn-around cycle. The load of the down link preferred bus 383 is thereby reduced, and the bus bandwidth is efficiently used.

On the other hand, when the north bridge 20 is currently controlling the up link preferred bus 387, if there is need for the south bridge 22 to control the bus, a request signal is transmitted through the up link command signal line 385 to the north bridge 20. At this moment, the north bridge 20 must immediately, or after the bus command currently executed on the up link preferred bus 387 is completed, hand over the ownership of the up link preferred bus 387 to the south bridge 22 after a turn-around cycle. Such that the time latency of data transmission is thereby prevented.

On the contrary, when the load of the up link preferred bus 387 driving by the south bridge 22 is relatively higher, a request signal is transmitted through the up link command signal line 385 to the north bridge 20. At this moment, if the north bridge 20 is currently controlling or is to control the down link preferred bus 383, the request transmitted from the south bridge 22 does not change the ownership of the bus and the north bridge 20 keep controlling the down link preferred bus 383. If the north bridge 20 does not need to control the bus, the ownership of the down link preferred bus 383 is handed over to the south bridge 22 after a turn-around cycle. The load of the up link preferred bus 387 is thereby reduced, which achieves an efficient control of the bus bandwidth.

When the south bridge 22 is controlling the down link preferred bus 383 and if there is need for the north bridge 20 to control the bus, a request signal is transmitted through the down link command signal line 381 to the south bridge 22. At this moment, the south bridge 22 must immediately, or after the bus command currently executed on the down link preferred bus 383 is completed, hand over the ownership of the down link preferred bus 383 to the north bridge 20 after a turn-around cycle. Then the time latency of data transmission is thereby prevented.

Through the bus structure and the arbitration method according to the invention, each control chip of the control chipset therefore can efficiently access the link bus, and is capable of dynamically adjusting the direction of transmission of each AD bus. A maximum utilization of the transmission bandwidth is thereby obtained, and each control chip is ensured to transmit data on the bus without too much time latency.

As described above, the invention therefore provides a link bus between control chipsets and an arbitration method that is particularly capable of dynamically adjusting the direction of bus transmission. According to an embodiment of the invention, a first AD bus and a second AD bus are placed between a first control chip and a second control chip. The first and second control chips respectively have a higher priority in respect of the first and second AD buses, respectively. Depending upon the load of each AD bus, the first and second control chips are capable of dynamically driving to control another AD bus, thereby improving the transmission efficiency in the control chipset.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A link bus between control chipsets comprising;
   a first address/data (AD) bus for transmitting addresses and data unidirectionally in a first unidirectional mode and in both directions in a first bidirectional mode;
   a second address/data bus for transmitting addresses and data unidirectionally in a second unidirectional mode and in both directions in a second bidirectional mode;
   a first control chip coupled to said first address/data bus and said second address/data bus, said first control chip controlling transmission on only said first address/data bus in said first unidirectional mode and controlling transmission on both said first address/data bus in said first bidirectional mode;
   a second control chip coupled to said second address/data bus and said first address/data bus, said second control chip controlling transmission on only said second address/data bus in said second unidirectional mode and controlling transmission on both said second address/data bus and said first address/data bus in said second bidirectional mode;
   a first command signal line for transmitting a first request signal to said second control chip from said first control chip, wherein said first control chip undergoes a transition from said first unidirectional mode to said first bidirectional mode only upon said second control chip receiving said first request signal while not transmitting on said second address/data bus; and
   a second command signal line for transmitting a second request signal from said second control chip to said first control chip, wherein said second control chip undergoes a transition from said second unidirectional mode to said second bidirectional mode only upon said first control chip receiving said second request signal while not transmitting on said first address/data bus.

2. The link bus of claim 1, wherein said first control chip is a north bridge chip, and said second control chip is a south bridge chip.

3. The link bus of claim 1, wherein said first control chip is a south bridge chip, and said second control chip is a north bridge chip.

4. A method for arbitration a link bus between control chipsets, said control chipsets including a first control chip, a second control chip, said link bus including a first address/data (AD) bus, and a second address/data bus, said method comprising:
   transmitting addresses and data through said first AD bus from said first control chip to said second control chip;
   transmitting a request signal only over a first request signal line from said first control chip to said second control chip to request control of said second AD bus by said first control chip;
   transmitting addresses and data from said first control chip to said second control chip through said second AD bus only if said second control chip is not transmitting on said second AD bus at a time of receipt of said request signal.

5. The method of claim 4, further comprising:
   transmitting a request signal only over a second request signal line from said second control chip to said first control chip while said first control chip is transmitting on said second AD bus and said second control chip requires said second AD bus;
   ceasing transmissions through said second AD bus from said first control chip; and
   transmitting addresses and data from said second control chip to said first control chip through said second AD bus.

6. The method of claim 4, wherein said first control chip is a north bridge chip, and said second control chip is a south bridge chip.

7. The method of claim 4, wherein said first control chip is a south bridge chip, and said second control chip is a north bridge chip.

8. An arbitration method of a link bus between control chipsets, said control chipsets including a first control chip, and a second control chip, said link bus including a first address/data (AD) bus, and a second address/data bus, said arbitration method comprising:
   controlling said second AD bus to transmit address and data from said second control chip to said first control chip;
   transmitting a request signal only over a first request signal line from said second control chip to said first control chip to request control of said first AD bus by said second control chip; and
   controlling said first AD bus to transmit addresses and data from said second control chip to said first control chip if said first control chip is not controlling said first AD bus at a time of receipt of said request signal.

9. The arbitration method of claim 8, further comprising:
   transmitting a request signal only over a second request signal line from said first control chip to said second control chip while said second control chip is controlling said first AD bus and said first control chip requires said first AD bus;
   relinquishing control of said first AD bus by said second control chip; and controlling said first AD bus to transmit addresses and data from said first control chip to said second control chip.

10. The arbitration method of claim 8, wherein said first control chip is a north bridge chip, and said second control chip is a south bridge chip.

11. The arbitration method of claim 8, wherein said first control chip is a south bridge chip, and said second control chip is a north bridge chip.

* * * * *